May 22, 1923.

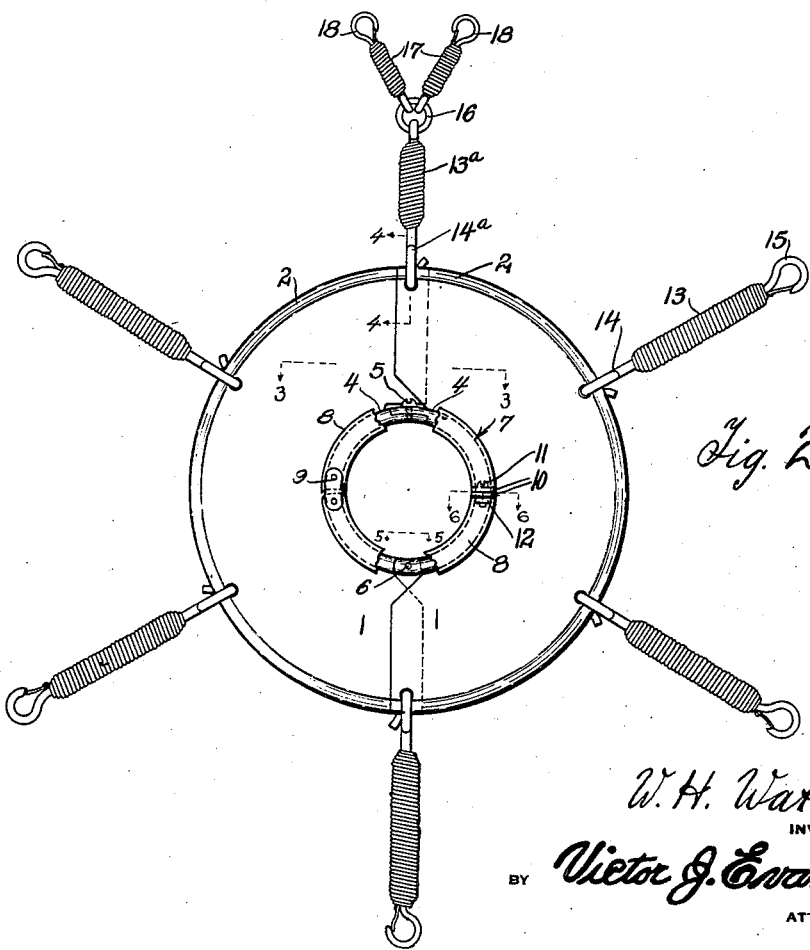

W. H. WATT, JR
CHAIN HOLDER
Original Filed Feb. 6, 1922

W. H. Watt Jr.
INVENTOR

BY Victor J. Evans
ATTORNEY

Patented May 22, 1923.

1,456,412

UNITED STATES PATENT OFFICE.

WILLIAM HENRY WATT, JR., OF WEST NEWTON, PENNSYLVANIA.

CHAIN HOLDER.

Application filed February 6, 1922, Serial No. 534,544. Renewed October 23, 1922. Serial No. 596,461.

*To all whom it may concern:*

Be it known that I, WILLIAM H. WATT, Jr., a citizen of the United States, residing at West Newton, in the county of Westmoreland and State of Pennsylvania, have invented new and useful Improvements in Chain Holders, of which the following is a specification.

This invention relates to holding devices, and more particularly to what I term a chain holder.

One of the main objects of the invention is to provide a device of simple construction and operation which may be readily applied to an automobile wheel and will act to prevent loss of an anti-skid chain in the event of separation or breakage of the same. A further object is to provide a device of the character stated which will assist in holding the chain about the wheel. Another object is to provide a device which may be readily assembled or disassembled, and may be quickly and easily applied to or removed from the wheel. Further objects will appear from the detailed description.

In the drawings:—

Figure 1 is a side view of the device as applied;

Figure 2 is an enlarged side view of the device, partly broken away;

Figure 3:
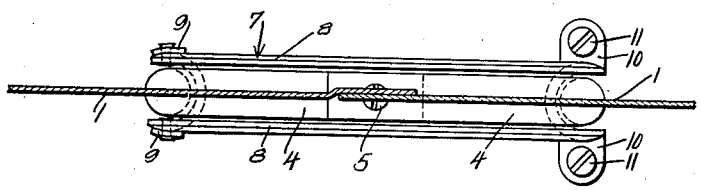
Figure 3 is a section taken substantially on line 3—3 of Fig. 2.
Figure 4:
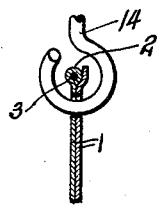
Figure 4 is a section taken substantially on line 4—4 of Fig. 2.
Figure 5:
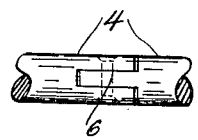
Fig. 5 is a view taken on line 5—5 of Fig. 2.
Figure 6:
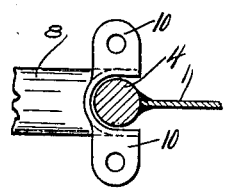
Figure 6 is a section taken substantially on line 6—6 of Fig. 2.

The device includes two substantially semi-circular sheet metal plates 1 which, when in assembled relation, overlap at their ends, these plates being each provided with a peripheral bead 2 within which is enclosed a reinforcing element or wire 3. Each plate 1 is provided at the central portion of its straight edge with a semi-circular opening about which is secured a rod 4, these rods overlapping at their ends and being detachably secured together at one end by means of a screw 5, or in any other suitable or preferred manner, and hingedly secured together at the other end at 6. The rods or sections 4 form a circular supporting member which fits into a ring 7 of U-shape in cross-section. This ring is formed of two sections 8 which are hingedly secured together at one end at 9. At the other end each section is provided, at each side, with an outwardly projecting tab 10. These tabs are provided with aligned openings which receive securing screws 11 upon which are threaded nuts 12 for securing the sections 8 together. A plurality of tension springs 13 radiate from the disc formed by plates 1, these springs being provided at their inner ends with hook members 14 which engage through openings in the plates, one of these hook members passing through aligned openings in the overlapping portions of plates 1 thus securing the plates together at one end. At its outer end each spring 13 is provided with a snap hook 15 which is adapted for engagement with side chain *a* of an anti-skid chain A of a known type mounted about tire *b* of wheel B. A tension spring 13$^a$ is provided with a hook member 14$^a$, at its inner end, which engages through openings through the overlapping portions of plates 1 at the other end thereof. A ring 16 is secured to the outer end of spring 13$^a$, and two tension springs 17 have their inner ends secured to this spring. Each of the springs 17 is provided at its outer end with a snap hook 18 adapted for engagement through end links 19 of side chain *a*, which end links are normally secured together by a fastening device 20 of any known or preferred type.

In applying the device, members 14 and 14$^a$ which engage through the overlapping portions of plates 1 are removed, after which screw 5 is removed sufficiently to disconnect the overlapping portions of members 4. This permits plates 1 to be turned outwardly away from each other about the axis of hinge 6, thus detaching ring 7. Screws 11 are then removed from tabs 10 thus permitting ring 7 to be opened and placed about the neck of hub cap C inside of head *c*. When this has been done, screws 11 are again secured through tabs 10 and members 4 and plates 1 are moved into closed position, with the circular supporting member formed by rods or members 4 positioned in ring 7 so as to turn about the same; after which screw 5 is secured through the overlapping portions of members 4 so as to secure the same together. After this has been done the springs are tensioned and the snap hooks carried thereby are engaged with side chains a. In the event of breakage of the anti-skid chain the springs and parts associated therewith serve to retain the chain so as to prevent loss of the same. Also, when the chain is in position, the springs act to hold the same about the tire. Springs 17 and the snap hooks 18 which engage through end links 19 of side chain a, and the parts associated therewith, serve to effectually prevent the anti-skid chain A from being thrown outwardly from the wheel in the event that the securing device 20 should become opened.

The device constructed in the manner illustrated and described may be readily produced at small cost and can be quickly and easily applied to any automobile wheel of standard construction and serves, in addition to preventing loss of the anti-skid chain, to hold the chain about the wheel. In the event of breakage of the chain ring 7, which is secured about the neck of the hub cap, can turn freely in the ring or circular supporting member formed by sections 4 thus preventing damage to the fender or other part of the automobile from the chain. As will be understood, changes in details of construction and arrangement of parts of the invention may be resorted to without departing from the field and scope of the same, and I intend to include all such variations, as fall within the scope of the appended claims, in this application in which a preferred form only of my invention is disclosed.

What I claim is:—

1. In a device of the character described, a ring adapted to be secured about a hub cap, a circular supporting structure loosely mounted in said ring, a disc secured to said circular structure, members radiating from said disc, and means for detachably securing said members at their outer ends to an anti-skid chain.

2. In a device of the character described, a circular supporting structure formed of two members detachably secured at one end and hingedly secured at the other end, two approximately semi-circular plates secured to the respective members and having their ends overlapping, connecting members radiating from said plates and provided at their outer ends with means for engagement with an anti-skid chain, certain of said members passing through the overlapping portions of the plates for securing the same together, and a ring positioned within and fitting about said circular supporting structure, said ring being adapted for securement about a hub cap.

3. In a device of the character described, a ring of channel cross-section formed of two members hingedly secured together at one end and detachably secured at the other end, a circular supporting structure mounted loosely in said ring and formed of two members detachably secured together at one end and hingedly secured together at the other end, approximately semi-circular plates secured to the respective members and having their ends overlapping, and connecting members radiating from said plates and provided at their outer ends with means adapted for engagement with an anti-skid chain, certain of said members passing through the overlapping ends of said plates and detachably securing the same together.

In testimony whereof I affix my signature.

WILLIAM HENRY WATT, Jr.